United States Patent Office 3,669,682
Patented June 13, 1972

3,669,682
REFRIGERATED DOUGH COMPOSITIONS AND PROCESS FOR PREPARING SAME
Charles William Lutz, Clark, N.J., assignor to FMC Corporation, New York, N.Y.
No Drawing. Filed Apr. 15, 1970, Ser. No. 28,923
Int. Cl. A21d 2/02
U.S. Cl. 99—90 NF
6 Claims

ABSTRACT OF THE DISCLOSURE

Inhibiting crystalline growth in acid pyrophosphate-leavened refrigerated dough compositions by adding to the dough mix a polyphosphate having an average chain length of from 4 to 8.

BACKGROUND OF THE INVENTION

Refrigerated doughs are utilized for the preparation of a variety of bakery goods, especially for pre-leavened packaged dough compositions which are in condition for immediate baking. The leavening system for these doughs generally consists of a slow acting leavening acid in combination with an alkaline substance capable of releasing carbon dioxide upon reaction with the leavening acid. The system most predominantly utilized is sodium acid pyrophosphate and sodium bicarbonate.

An essential requirement of these refrigerated doughs is that they exhibit a reasonably long storage life in view of the time needed for their distribution and the potential delays before the sale and use thereof. In view of the extended storage period and the tendency for the leavening agents to react in the aqueous phase of the dough, it has been noted that the phosphate leavening agents tend to form visible disodium orthophosphate dodecahydrate ($Na_2HPO_4 \cdot 12H_2O$) crystals. This crystal formation most frequently occurs at storage temperatures of from 32 to 50° F. These glassy monoclinic crystals range in size from tiny grits to particles of 5 millimeters and larger and are found both within the dough mass and on its surface. These visible crystals cause consumer rejection because of their glass-like appearance and an uneven coloration of the baked goods which develops upon baking.

Various solutions have been proposed to overcome this crystallization problem. U.S. Pat. 2,942,988 teaches the use of fumaric acid for crystallization inhibition. U.S. Pat. 3,297,449 teaches the substitution of potassium bicarbonate for all or part of the sodium bicarbonate content of the leavening mixture. Various physical approaches have also been attempted including shock cooling of the dough; the deposition in the dough of microscopic crystals of the orthophosphate; and combining an edible organic acid with a laminated, physically modified dough. While these methods have been successful to some degree, they have also shown some disadvantages such as the lack of control over the leavening reaction, added expense, and adverse effect on other properties of the dough mixture.

SUMMARY OF THE INVENTION

It is the primary object of this invention to provide means for inhibiting crystalline growth in acid pyrophosphate leavened refrigerated dough mixtures.

It is a further object to accomplish this crystallization inhibition without adversely affecting other properties of the refrigerated dough mixtures.

Various other objects and advantages of this invention will become apparent from the following detailed description thereof.

I have now discovered a method for inhibiting the growth of disodium orthophosphate dodecahydrate crystals in refrigerated doughs which comprises adding a small amount of a polyphosphate to the dough mix during the formulation thereof. Thus, the refrigerated doughs can now be stored for extended periods at their normal above freezing storage temperatures, i.e. about 32 to 50° F., without exhibiting visible crystal formation. Furthermore, neither the properties nor the conventional processing operation of the refrigerated dough are adversely affected by the addition of the polyphosphate.

DESCRIPTION OF THE PREFERRED EMBODIMENTS

The composition of refrigerated doughs and methods for their preparation are well known to those skilled in the baking art. For purposes of this invention, any suitable recipe may be utilized, depending on the nature of the desired final baked product. Ingredients which are generally common to all recipes include flour, shortening, water, sugar, salt, dried milk solids and the leavening system. The grade of component may be any customary to the industry. The concentration of each of these ingredients will vary with the nature of the ingredient and the specific baked goods being prepared. The sodium or potassium bicarbonate which reacts with the leavening acid to release carbon dioxide is generally present in an amount slightly in excess of that required to completely neutralize the leavening acid.

The crystallization problem which underlies the present invention is peculiar to the use of acid pyrophosphate as leavening acid. This pyrophosphate exhibits slow reactivity in order to minimize the carbon dioxide evolution prior to the filling and sealing of the dough package. The leavening acid most frequently used is sodium acid pyrophosphate, hereinafter referred to as SAPP. The leavening acid is typically present in the dough mix in a concentration of from about 1 to 3%, by weight.

The polyphosphates which serve to inhibit crystal formation in refrigerated doughs are the relatively short chain alkali metal polyphosphate glasses and the corresponding polyphosphoric acids which have an average chain length of from 4 to 8. These polyphosphates are generally prepared by condensing orthophosphates, orthophosphoric acid, or mixtures of these, to form chain molecules having phosphorus-oxygen-phosphorus bonds. The molecular structure of these polyphosphates can be represented as follows:

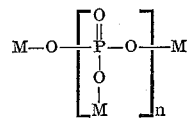

in which M is alkali metal or hydrogen and $n$ represents the average chain length (average number of phosphorus atoms per molecule). Each of these polyphosphates tends to form as a mixture of chain polymer species having a somewhat random distribution of chain lengths grouped around the average chain length, and this distribution is dependent on the M to P ratio. The distribution of chains in various alkali metal polyphosphate glasses is described by Westman et al. (The Journal of the American Ceramic Society, vol. 40, p. 293, 1957). The composition of the polyphosphoric acids is described by Huhti et al. (Canadian Journal of Chem., vol. 34, p. 785, 1956) and of mixed sodium-acid polyphosphate glasses by Westman et al. (Canadian Journal of Chem., vol. 37, p. 1764, 1959). Among the polyphosphates applicable to this invention is "Sodaphos," a commercially available sodium polyphosphate glass having an average chain length of about 5 to 7 and a $P_2O_5$ content of about 63 to 64%. The corresponding potassium or mixed sodium-potassium glasses may be used but the sodium glasses are preferred because of commercial availability and low cost. The corresponding polyphosphoric acids or acid-glasses may also be used since they become neutralized in the dough formulation, but the normal sodium glasses are easier to handle and incorporate into the formulation. The polyphosphate should be present in the raw dough mixes in a concentration of from about 0.1 to 1.0%, based on the weight of the pyrophosphate leavening agent.

In practicing the novel process of this invention, it is necessary that the polyphosphate be uniformly dispersed in the raw dough mix.

For example, depending upon the particular procedure desired by the one who is practicing this invention, the acid pyrophosphate and the polyphosphate can be mixed together prior to being blended with the flour, salt, sugar, shortening, or other ingredients which are then combined with the water to produce the final dough or batter. Improvement in the storage stability of chemically leavened baking compositions containing acid pyrophosphate can also be obtained when the dry leavening ingredients are mixed into an otherwise already-prepared dough or batter. Still further improvement in the storage stability of these chemically leavened baking compositions can be accomplished when the acid pyrophosphate, the polyphosphate and the baking carbonate are intermixed with at least part of the remaining dry ingredients which are used in the baking composition (i.e. the flour, sugar, baking carbonate, salt and/or shortening), before the water or milk is added to make the final dough or batter. Since the essential aspect is that there be a complete and uniform dispersal of the additive, any method capable of providing such intimate dispersion without deleteriously affecting the resultant product are acceptable for use in this process. The standard dough mixing and packaging techniques are applicable to the present invention. Customarily, two mixing stages have been utilized, the first wherein the major dry ingredients are blended, and then admixed with water for the bulk of the time needed for dough development, and the second wherein the minor ingredients, usually premixed in advance, are added and mixing continued to the desired end point. The premix for the second stage includes salt and ordinarily the bicarbonate as well. In this way, premature initiation of the leavening reaction is avoided. If desired, both leavening agents can be incorporated by way of the second stage treatment. First stage mixing can be carried out in any commercial dry mixer, such as a Hobart paddle mixer, or alternatively, directly in the dough mixer. In the latter case, a sigma blade kneader or dough mixer is particularly suitable. The shortening is desirably withheld from the first stage until the remaining major dry ingredients have been blended together. The shortening can then be added and mixing continued until the shortening forms tiny pebbles or balls, indicating that an almost homogeneous mixture, i.e. a grossly uniform mix, has been achieved. If not already in a dough mixer, the mixture is then transferred to such a unit and at this point, substantially all of the recipe water or other aqueous liquid is added and the mixer is operated until the dough has reached a slightly-to-moderately developed condition. Thereafter, the second stage premix is added and the mixing continued until the premix ingredients are uniformly dispersed within the dough. Preferably, the dough is maintained at a reasonably low temperature during its formation and development. To this end, the mixer can be equipped with a jacketed bowl connected to a convenient source of coolant, such as water chilled to about 35° F. Further cooling can be effected by chilling to a similar low temperature either or both of the recipe liquid and the major dry ingredients.

After mixing and development, the dough is ready for sheeting, cutting, and packaging. In sheeting, the dough mass is rolled into a flat, thin layer often with two or more separate rolling operations. The sheeted dough is then cut into biscuit-size pieces of the desired dimension and configuration, preferably leaving a clearance of about one-sixteenth inch with the inside package diameter to facilitate filling. 24 gram pieces cut with a 1⅞ inch hexagonal cutter are quite satisfactory for this type of carton or packages curently in widespread use. These cartons have a capacity of ten pieces, although the precise number is obviously not critical, and are formed of a fiberboard tube having inner and outer metallic foil liners, which is closed at the ends by sheet metal panels clamped or crimped into place. Although these cartons are not airtight, a good seal is nevertheless achieved during the course of proofing.

When the cartons have been loaded and the end panels attached, they are proofed at 90° F. for a period of time ranging from about one-half to several hours and until the pieces rise sufficiently to completely fill the carton and expel residual air. In this way, the dough pieces, in effect, provide their own seal preventing the loss of leavening gas therefrom. Once proofed, the cartons are refrigerated and then ready for distribution and sale.

A variety of refrigerated dough products can be made in this manner including biscuits, turnovers, muffins, rolls, buns, waffles, Danish pastry, puff pastry and the like. All of these products will be characterized by extended storage capability and the absence of substantially all visible orthophosphate crystal formation.

The following examples will more fully illustrate the embodiment of this invention.

Example I

This example illustrates the preparation of a typical refrigerator dough by means of the novel process of this invention as well as the improved properties of the resulting dough.

A series of biscuit doughs were prepared having the following formulation:

| | Grams |
|---|---|
| Flour | 100 |
| Salt | 2 |
| Sugar | 2 |
| Base mix (76.75%, by weight, starch; 20.75%, by weight, monocalcium phosphate; 2.5%, by weight, calcium lactate) | 1.8 |
| Dry milk solids | 3 |
| Sodium bicarbonate | 2.25 |
| SAPP | 2.7 |
| Shortening | 10 |
| Water | 62 |

For each dough, the dry ingredients were blended and the shortening uniformly blended into the dry mix. The water was added and mixing continued until a uniform "doughy" consistency was obtained. The dough was hand kneaded for three minutes and, then returned to the mixing bowl and allowed to rise for thirty minutes. Thereafter, the dough was placed in a closed container which was stored at a temperature of 45° F. The stored samples were periodically examined in order to determine the test period at which the crystals were first observed. The nature of the crystal formation, and particularly its maximum dimension, were also noted.

The polyphosphate additive used as a crystal inhibitor in these tests was "Sodaphos," a sodium polyphosphate glass having an average chain length of about 5 to 7 and a $P_2O_5$ content of 63 to 64%.

The concentration of inhibitor used and the test results are presented in the following table:

| Polyphosphate additive (wt. percent) [1] | Time required for crystal formation (days) | Extent and degree of crystallization |
|---|---|---|
| 0.1 | 10 | Grit and crystals, 1 mm. |
| 0.3 | 20 | 1-2 mm. |
| 0.5 | 60 | Slight crystallization. |
| 1.0 | 50 | 2-4 mm. |
| | 30 | 3-4 mm. |

[1] Based on the weight of SAPP.

The data summarized above clearly illustrates the increased crystal inhibition, and correspondingly increased shelf life, of refrigerated doughs containing polyphosphates in accordance with the novel process of this invention.

Example II

The procedure set forth in Example I hereinabove was repeated with the exception that 0.3 gram of disodium orthophosphate dodecahydrate seed crystals was blended into each batch of dough before placing it in the sealed container for low temperature storage. The procedure set forth in this example represents a more severe test for determining crystallization inhibition.

The crystals were prepared by admixing sodium carbonate and 85% phosphoric acid in water so as to obtain an aqueous solution containing 14%, by weight, $Na_2O$ and 20%, by weight, $P_2O_5$. The solution was subjected to high agitation. After crystallization, the agitation was reduced in intensity and maintained for a period of 24 hours. The resulting seeds were isolated by blotting and rubbing the crystals with filter paper. Thereafter, only the uniformly shaped, 1 millimeter crystals were selected for the test. The selected crystals were then placed in a hygrostat over a saturated solution of disodium orthophosphate dodecahydrate and maintained therein for a period of several days in order to insure that all the seeds were in the dodecahydrate form.

As in Example I, the various dough samples were stored at 45° F. and periodically examined. The dough was reseeded only if on examination no crystals or grit were found. The disappearance or reduction in size of the seed crystals is a significant factor in rating the effectiveness of the inhibitor.

The results of this test are presented in the following table:

| Polyphosphate additive (wt. percent)[1] | Times reseeded | Time required for crystal growth (days) | Extent and degree of crystallization |
|---|---|---|---|
| ---- | 0 | 10 | 25-50% increase in seed size. |
| 0.1 | 0 | 20 | 1-2 mm. |
| 0.3 | 2 | 60+ | Grit only. |
| 0.5 | 1 | 50 | 1-2 mm. |
| 1.0 | 2 | 30 | 3-4 mm. |

[1] Based on the weight of SAPP.

This data further illustrates the effectiveness of polyphosphates as crystallization inhibitors in refrigerated doughs.

Summarizing, this invention provides a novel process for inhibiting crystal formation in refrigerated doughs and for preparing refrigerated doughs of extended shelf life.

Variations may be made in proportions, procedures and materials without departing from the scope of the invention which is defined by the following claims.

What is claimed is:

1. A process for inhibiting crystalline formation and growth in refrigerator doughs containing an acid pyrophosphate leavening agent which comprises uniformly dispersing in the raw dough mix from about 0.1 to 1.0%, based on the weight of said acid pyrophosphate, of a polyphosphate having an average chain length of from about 4 to 8.

2. The process of claim 1, wherein said acid pyrophosphate is sodium acid pyrophosphate.

3. The process of claim 1, wherein said polyphosphate is a sodium polyphosphate glass having an average chain length of about 5 to 7 and a $P_2O_5$ content of about 63 to 64%, by weight.

4. A raw refrigerator dough mix comprising flour, water, shortening, an acid pyrophosphate leavening agent, and an alkali-metal bicarbonate, said dough mix having intimately admixed therein from about 0.1 to 1.0%, based on the weight of said acid pyrophosphate, of a polyphosphate having an average chain length of from about 4 to 8 whereby crystalline formation and growth in the doughs is inhibited.

5. The raw dough mix of claim 4, wherein said acid pyrophosphate is sodium acid pyrophosphate.

6. The raw dough mix of claim 4, wherein said polyphosphate is a sodium polyphosphate glass having an average chain length of about 5 to 7 and a $P_2O_5$ content of about 63 to 64% by weight.

References Cited
UNITED STATES PATENTS

| | | | |
|---|---|---|---|
| 2,942,988 | 6/1960 | Erekson et al. | 99—95 X |
| 3,297,449 | 1/1967 | Baker et. al. | 99—95 X |
| 3,397,706 | 8/1968 | Matz | 99—192 BB X |

RAYMOND N. JONES, Primary Examiner

J. R. HOFFMAN, Assistant Examiner

U.S. Cl. X.R.

99—92, 95, 192 BB